March 4, 1969   B. F. LUDOVICI ET AL   3,431,048
PROJECTION SYSTEM HAVING SECONDARY IMAGE CARRIER
Filed Oct. 18, 1966

INVENTORS.
BRUNO F. LUDOVICI
GERHARD K. MEGLA
BY
William J. Simmons
ATTORNEY

United States Patent Office 3,431,048
Patented Mar. 4, 1969

3,431,048
PROJECTION SYSTEM HAVING SECONDARY
IMAGE CARRIER
Bruno F. Ludovici, Owego, N.Y., and Gerhard K. Megla, Raleigh, N.C., assignors to Corning Glass Works, Corning, N.Y., a corporation of New York
Filed Oct. 18, 1966, Ser. No. 587,485
U.S. Cl. 353—22           11 Claims
Int. Cl. G03b 21/26

ABSTRACT OF THE DISCLOSURE

An image projection system in which an image is transferred from a primary image carrier to an intermediate image carrier, a photochromic glass plate, which is illuminated by a high intensity light to provide the projected image. The photochromic glass plate is initially darkened by an ultraviolet light. A weak red light which has passed through a primary image carrier bleaches an image on the photochromic glass plate which is identical to that contained on the primary image carrier.

---

One of the disadvantages of conventional image projectors is that the carrier of the pictorial information, e.g., a photographic slide, is exposed to light and heat of relatively high power density. Especially in instances where images are projected for viewing by large groups, the heat exposure is such that the image carrier will be permanently damaged if the projection is not limited to a very short period of time.

Therefore, an object of this invention is to provide an image projection system which overcomes the disadvantages of the prior art.

Another object of this invention is to provide an image projection system in which a high intensity image may be projected for a long period of time without damaging the image carrier.

The present invention utilizes the variable light transmission properties of photochromic glass. This type of glass has the property of becoming less transparent if irradiated with blue or ultraviolet light, remaining unaffected by green light and becoming more transparent if irradiated by red or orange light. The characteristics and production of such glass are described in U.S. Patent No. 3,208,860 granted to W. H. Armistead and S. D. Stookey on Sept. 28, 1965.

In accordance with the present invention the original image carrier, such as a slide, is transilluminated by a weak, projected white light beam. The light beam which passes through the slide is filtered to permit only the red wave lengths to pass to the photochromic glass plate by way of a dichroic mirror. There the beam forms an image in the form of a bleached area. Those parts of the plate which are not being bleached are kept darkened by an ultraviolet flood illumination, which is weak enough to be overruled by the bleaching beam. In addition, a strong green flood light is projected onto the plate by way of the dichroic mirror. The green light does not affect the optical density of the photochromic glass, but it is affected by the photochromic glass in that it will pass through the bleached portion of the plate and be absorbed by the activated or darkened portion. By passing this green light from the photochromic plate through a suitable objective lens system, an amplified green image corresponding to the original image can be projected to a distant screen.

Figure 1:
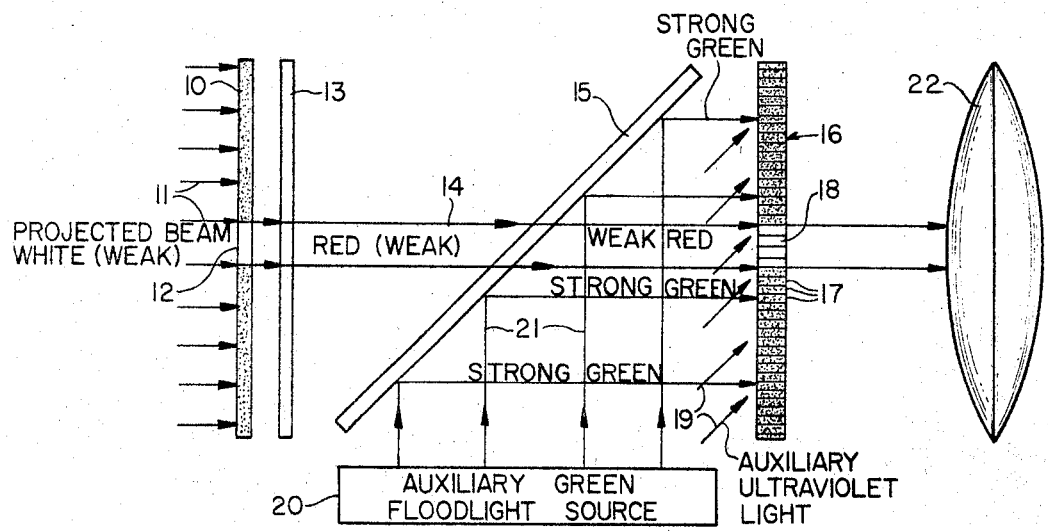
Figure 2:
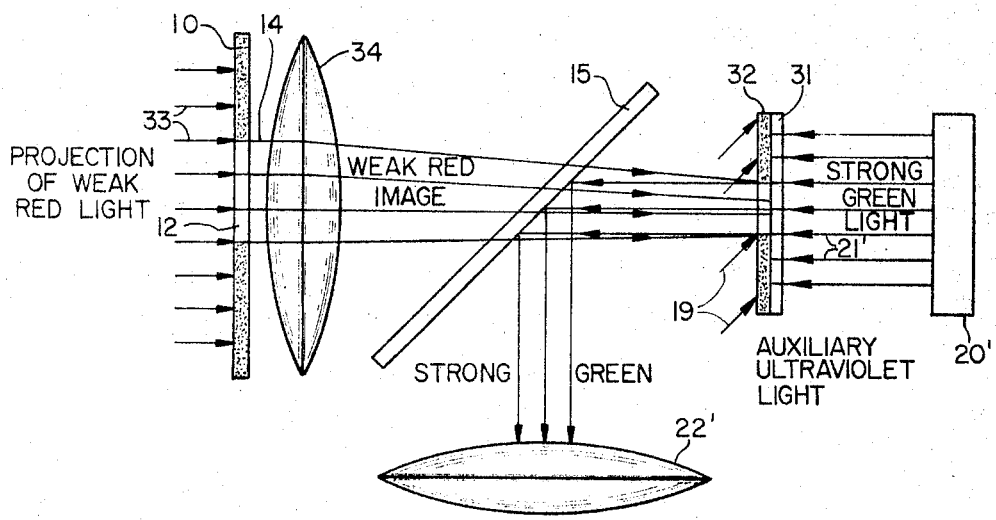

Other objects, advantages, and features will become apparent from consideration of the following description when taken in conjunction with the drawings wherein:

FIGURE 1 is a schematic view of a projection system utilizing a photochromic fiber optics plate as the secondary image carrier; and FIGURE 2 is a schematic view of a modified projection system in which the intensified image is projected from the same side of the photochromic plate as that onto which the weak image is projected.

Referring now to FIGURE 1, there is shown a projection system constructed in accordance with the present invention. An image carrier 10, such as a photographic slide, is illuminated by a source of white light which projects a weak beam of light 11 therethrough. The central portion 12 of the image carrier is shown to be lighter than the remaining portion for the purpose of illustrating the information contained thereon. The information beam of weak white light passes through a red transmitting filter 13 to provide an information beam 14 of weak red light. The weak red beam passes through a dichroic mirror 15, which passes red light and reflects green light, and impinges upon a fiber optic photochromic plate 16. This plate comprises a plurality of individual photochromic glass fibers 17 which are arranged in parallel relationship, the ends of these fibers forming the two planar surfaces of the plate 16. The red beam forms an image on the photochromic plate in the form of a bleached area 18. The remainder of the photochromic plate is kept darkened by an ultraviolet flood illumination 19, which is kept weak enough to be overruled by the bleaching beam. A green flood light source 20 projects a strong green light beam 21 which is reflected by the dichroic mirror 15 onto the photochromic plate. This green light does not affect the optical density of the photochromic glass; it passes through the bleached fibers of the plate while being absorbed by the activated ones. An objective lens 22 is aligned with the photochromic plate so that any light passing through the plate is imaged by the lens onto a distant screen not shown. A bright green image corresponding to the original image on the carrier 10 therefore appears on the screen.

The objective lens 22 is placed farther from the photochromic plate than the focal length of the lens. Although a single convex lens is illustrated, a compound lens system could replace the single lens to produce an improved image.

In the modification shown in FIGURE 2 the intensified image is projected from the side of the photochromic plate onto which the weak red image is projected. In this embodiment a dichroic mirror 31, which transmits green light and reflects red light, is superimposed on the surface of a photochromic glass plate 32. A green flood light source 20' is situated adjacent the dichroic mirror 31. A weak red light beam 33 passes through the primary image carrier 10 to provide a red information beam 14. The information beam is reduced in size by a lens 34, passes through a dichroic mirror 15 and impinges upon the photochromic plate 32. The weak red beam traverses the photochromic plate 32, is reflected by the dichroic mirror 31, and retraverses the photochromic plate, thereby bleaching an image in the photochromic glass plate corresponding to the original image on the image carrier 10. The strong green light 21' passes through the dichroic mirror 31 and the bleached area of the photochromic glass plate 32 and is reflected by the dichroic mirror 15. This green light is then imaged by the objective lens 22' onto a distant viewing screen not shown.

An advantage of the arrangement shown in FIG. 2 is that the photochromic glass is exploited more efficiently since the weak bleaching beam traverses it twice. Furthermore, since the resolution of a photochromic glass plate is very high (more than 2100 lines per mm. can easily be resolved) the red information beam can be imaged down by the lens 34 to cover a very small area on the photochromic glass plate. A relatively weak red light source can then be used to supply the power density required for bleaching the photochromic glass. The image on the photochromic glass plate would then be enlarged by the objective lens during projection.

The homogeneous photochromic glass plate 32 could be replaced by the fiber optics type of photochromic glass plate which is shown in FIGURE 1. The fiber optics plate is preferred since it provides greater resolution and sensitivity.

The ultraviolet light source 19 could be combined with the green flood light source if the dichroic mirror 31 were selected to be one which reflects red light and passes both green and near ultraviolet light. The near ultraviolet light passing through the dichroic mirror would darken the photochromic glass plate 32. As in the above described embodiments, the near ultraviolet light would have to be weak enough that the bleaching effect of the red information beam would overcome the darkening effect of the near ultraviolet light.

The ultraviolet light may be applied to the photochromic plate in either of two different ways. It could be pulsed on during those periods when the red information beam is off, or it could continually remain on. The power density of the ultraviolet light should be about 3 to 5 millijoules per cm.$^2$ per db to darken the photochromic glass. If the ultraviolet light is pulsed on when the red light is off and is off when the red light is on, the power density of the red light should be about 30 millijoules per cm.$^2$ per db to bleach the photochromic glass. However, the power density of the red light will have to be somewhat greater if the ultraviolet light continually remains on in order that the darkening effect of the ultraviolet light can be overcome by the red beam. When the projector is operated in this latter mode, the ultraviolet light will darken the photochromic glass between slides and will keep dark those areas of the photochromic glass which are not being bleached by the red beam. The power of the green light is about 0.4 watt for an average screen. The power of the green light source may be as high as required depending on the brightness of the display screen since the photon energy of this particular wavelength is neutral and neither bleaches nor darkens the photochromic glass.

We claim:
1. An image projection system comprising a photochromic glass plate having first and second planar sides, first light source means for projecting a low intensity information carrying beam of light on said photochromic glass plate, the wavelength of said information beam being such that it bleaches that portion of said plate through which it passes, second light source means for projecting on said plate a beam of light the wavelength and intensity of which are such that it tends to darken said plate, third light source means for projecting on said plate a beam of light intensity of which is greater than that of said information carrying beam, and the wavelength of which is such that it has no effect on the optical density of said photochromic glass, said third light beam passing through the bleached areas of said plate, and means for imaging the light emerging from said photochromic glass plate at a distant viewing point.

2. An image projection system according to claim 1 which further includes means situated adjacent to said first light source means for reducing the size of the image whic his projected on said photochromic glass plate by said first light source means.

3. An image projection system according to claim 1 wherein said first light source means consists of a primary image carrier, means to transilluminate said primary image carrier, and filter means for passing light emerging from said primary image carrier, the wavelength of which is such that it bleaches said photochromic glass plate.

4. An image projection system according to claim 1 wherein said second light source continuously emits light.

5. An image projection system according to claim 1 wherein said second light source is on only when said first light source is off.

6. An image projection system according to claim 1 wherein said first light source and said third light source are located adjacent to said first side of said photochromic glass plate and said imaging means is located adjacent to said second side of said photochromic glass plate.

7. An image projection system accoring to claim 1 wherein said first light source means and said imaging means are located adjacent to said first side of said photochromic glass plate and said third light source means is located adjacent to said second side of said photochromic glass plate.

8. An image projecting system according to claim 1 wherein said plate comprises a fiber optics plate which consists of a plurality of parallel photochromic glass fibers.

9. An image projection system according to claim 1 which further comprises a first dichroic mirror which is located between said first light source means and said photochromic glass plate and which is situated at an angle with said photochromic plate, said first dichroic mirror exhibiting the properties of passing light from said first light source means and reflecting light from said third light source means.

10. An image projection system according to claim 9 wherein said third light source means is situated adjacent said first dichroic mirror so that light therefrom reflects from said first dichroic mirror and impinges on said photochromic plate, and said imaging means is located on the side of said plate opposite said first mirror.

11. An image projection system according to claim 9 which further includes a second dichroic mirror superimposed on said photochromic glass plate on the side thereof which is opposite said first dichroic mirror, said second dichroic mirror being adapted to pass light from said third light source means and reflect light from said first light source means, said first light source means being positioned adjacent said first dichroic mirror so that light therefrom passes through said first dichroic mirror and impinges upon said photochromic glass plate, said third light source means being positioned adjacent said second dichroic mirror so that light therefrom passes through said second dichroic mirror and the bleached areas of said photochromic glass plate, and reflects from said first dichroic mirror, and said imaging means is positioned adjacent said first dichroic mirror so that light from said third light source reflecting from said first dichroic mirror passes therethrough.

References Cited

UNITED STATES PATENTS

| | | | |
|---|---|---|---|
| 3,085,469 | 4/1963 | Carlson | 350—160 |
| 3,134,297 | 5/1964 | Carlson et al. | 350—160 |
| 3,238,841 | 3/1966 | Bjelland et al. | 350—160 |

NORTON ANSHER, *Primary Examiner.*

R. M. SHEER, *Assistant Examiner.*

U.S. Cl. X.R.

250—71; 350—160; 353—20, 29; 355—1